(12) United States Patent
Yano

(10) Patent No.: US 9,178,393 B2
(45) Date of Patent: Nov. 3, 2015

(54) MULTIPLE POLE SPHERICAL STEPPING MOTOR AND MULTIPLE POLE SPHERICAL AC SERVO MOTOR

(75) Inventor: Tomoaki Yano, Ibaraki (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 482 days.

(21) Appl. No.: 13/813,280

(22) PCT Filed: Jul. 11, 2011

(86) PCT No.: PCT/JP2011/065792
§ 371 (c)(1),
(2), (4) Date: Jan. 30, 2013

(87) PCT Pub. No.: WO2012/017781
PCT Pub. Date: Feb. 9, 2012

(65) Prior Publication Data
US 2013/0127285 A1    May 23, 2013

(30) Foreign Application Priority Data

Aug. 4, 2010    (JP) ................................. 2010-175157

(51) Int. Cl.
*H02K 21/12*    (2006.01)
*H02K 1/27*    (2006.01)
*H02K 41/03*    (2006.01)

(52) U.S. Cl.
CPC .............. *H02K 1/274* (2013.01); *H02K 41/031* (2013.01); *H02K 2201/18* (2013.01)

(58) Field of Classification Search
USPC ............. 310/156.35, 156.38, 156.43, 156.45, 310/112
See application file for complete search history.

(56) References Cited

U.S. PATENT DOCUMENTS

| | | | | |
|---|---|---|---|---|
| 3,854,341 A | * | 12/1974 | Quermann | ........................ 74/5.7 |
| 5,204,570 A | * | 4/1993 | Gerfast | ..................... 310/156.38 |
| 5,280,225 A | * | 1/1994 | Pine et al. | ...................... 318/575 |
| 5,402,049 A | * | 3/1995 | Lee et al. | .................... 318/568.1 |
| 5,798,590 A | * | 8/1998 | Sakabara | .............. 310/156.19 |
| 2002/0053849 A1 | * | 5/2002 | Corcoran | ................. 310/156.01 |

(Continued)

FOREIGN PATENT DOCUMENTS

| | | |
|---|---|---|
| JP | 60-204252 | 10/1985 |
| JP | 62-081970 | 4/1987 |

(Continued)

*Primary Examiner* — Thanh Lam
(74) *Attorney, Agent, or Firm* — McCarter & English

(57) ABSTRACT

Provided is a means for mitigating strict constraints between a virtual polyhedron inscribed in a rotor and a virtual polyhedron inscribed in a stator of a spherical stepping motor and a spherical AC servo motor and drastically increasing the degree of freedom in design. The above problem is solved by disposing permanent magnets at points of division of the sides of the virtual polyhedron inscribed in the rotor and electromagnets at points of division of the sides of the virtual polyhedron inscribed in the stator. A multiple pole spherical stepping motor and a multiple pole spherical AC servo motor include a rotor with permanent magnets disposed at the vertexes of a virtual polyhedron inscribed in a sphere and at points of division of arcs corresponding to the sides connecting the vertexes, and a stator with electromagnets disposed at the vertexes of a virtual polyhedron inscribed in a sphere containing the sphere of the rotor and at points of division of arcs corresponding to the sides connecting the vertexes.

12 Claims, 9 Drawing Sheets

(56) References Cited

U.S. PATENT DOCUMENTS

| | | | |
|---|---|---|---|
| 2003/0178901 A1* | 9/2003 | Erten et al. | 310/112 |
| 2004/0124729 A1* | 7/2004 | Long | 310/156.38 |
| 2004/0232790 A1* | 11/2004 | Mendenhall | 310/112 |
| 2009/0230787 A1* | 9/2009 | Won et al. | 310/38 |
| 2010/0007303 A1* | 1/2010 | Chetelat | 318/689 |

FOREIGN PATENT DOCUMENTS

| | | |
|---|---|---|
| JP | 2007-060891 | 8/2007 |
| JP | 2009-296864 | 12/2009 |

* cited by examiner

N-pole magnet 7 and
S-pole magnet 12
are hidden from view

This plane →

Truncated dodecahedron

Truncated icosahedron

Cuboctahedron

Icosidodecahedron

Rhombicuboctahedron

Rhombicosidodecahedron

Rhombitruncated cuboctahedron

Rhombitruncated icosidodecahedron

MULTIPLE POLE SPHERICAL STEPPING MOTOR AND MULTIPLE POLE SPHERICAL AC SERVO MOTOR

This is a national stage application filed under 35 USC 371 of PCT/JP2011/065792, filed Jul. 11, 2011, which claims the benefit of Japanese Patent Application No. 2010-175157, filed Aug. 4, 2010, all of which are incorporated herein, in entirety, by reference.

TECHNICAL FIELD

The present invention relates to a multiple pole spherical stepping motor and a multiple pole spherical AC servo motor.

BACKGROUND OF THE INVENTION

Patent Document 1 describes a three-dimensional motor according to an invention by the present inventor. The three-dimensional motor is provided with a stator with windings disposed about axes in three directions orthogonal to one another for producing respective rotating fields such that a composite rotating field of an arbitrary direction can be produced; and a rotor supported within the stator such that the rotor can be rotated in an arbitrary direction and rotated by the rotating fields of the stator. The three-dimensional motor may provide a three-dimensional synchronous motor when a permanent magnet is used for the rotor, a three-dimensional induction motor when a material allowing induction current flow is used for the rotor, or a three-dimensional reluctance motor when a magnetic material with salient poles is used for the rotor.

Patent Document 2 describes a spherical stepping motor according to an invention by the present inventor. The spherical stepping motor includes a rotor with permanent magnets disposed at the vertexes and the center of each face of a polyhedron inscribed in the rotor, and a stator with electromagnets disposed at the vertexes and the center of each face of a polyhedron inscribed in the stator, the number of corners of a polygon of the polyhedron inscribed in the rotor and the number of corners of a polygon of the polyhedron inscribed in the stator being coprime. The combination of the permanent magnets of the rotor and the electromagnets of the stator may be selected from a configuration in which the electromagnets are disposed on the rotor side while the electromagnets are disposed on the stator side; a configuration in which a magnetic material is disposed on the rotor side while the electromagnets are disposed on the stator side; a configuration in which the permanent magnets are disposed on the rotor side while a hybrid configuration of the permanent magnets and the electromagnets is disposed on the stator side; or a configuration in which a hybrid configuration of the permanent magnets and the electromagnets is disposed on the rotor side while a hybrid configuration of the permanent magnets and the electromagnets is disposed on the stator side.

Patent Document 3 describes a spherical stepping motor and a spherical AC servo motor according to an invention by the present inventor. The spherical stepping motor includes a rotor with permanent magnets disposed at the vertexes, the center of the sides, and the center of each face of a polyhedron inscribed in the rotor, and a stator with electromagnets disposed at the vertexes and the center of each face of a polyhedron inscribed in the stator, the number of corners of a polygon of the polyhedron inscribed in the rotor and the number of corners of a polygon of the polyhedron inscribed in the stator being coprime. A spherical AC servo motor may be configured by adopting a Halbach array for the permanent magnets of the rotor and supplying a sine wave current to the electromagnets.

Non-patent Document 1 describes a spherical synchronous motor with a configuration similar to the configuration of the three-dimensional motor described in Patent Document 1.

Non-patent Documents 2 and 3 describe spherical induction motors. The spherical induction motors described in these documents rotate with the same principle as that for the three-dimensional motor described in Patent Document 1. The spherical induction motor described in Non-patent Document 2 differs from the three-dimensional motor described in Patent Document 1 in that the windings in Non-patent Document 2 are multipolarized.

Non-patent Document 4 describes a spherical reluctance motor. The spherical reluctance motor produces a rotating field by a total of 20 electromagnets circumferentially disposed in upper and lower two levels on a stator, and produces a rotating force by utilizing a change in reluctance with respect to salient poles circumferentially disposed in upper and lower two levels on a rotor.

Non-patent Document 5 describes a spherical stepping motor. The spherical stepping motor includes a stator with a total of 16 electromagnets; specifically, one at the center of a bottom surface, five on a circumference around the center, and further 10 on an outer circumference around the center. The spherical stepping motor also includes a rotor with a total of 24 permanent magnets; specifically, 4, 8, and 12 permanent magnets on respective circumferences around the center of the bottom surface. The rotor is rotated by attracting the magnets of the rotor by supplying a current to the electromagnets near where the rotor is desired to be moved.

Non-patent Document 6 describes a spherical stepping motor with a configuration different from that of the spherical stepping motor according to Non-patent Document 5. The spherical stepping motor according to Non-patent Document 6 includes a spherical rotor and stator which are each segmented along longitudes and latitudes. The rotor includes permanent magnets with N-poles and S-poles facing the surface alternately arranged in the segments. The stator includes electromagnets arranged in the corresponding segments. The rotor includes 4 stages of 12 poles for a total of 48-pole permanent magnets. The stator includes 6 stages of 16 poles per stage for a total of 96 electromagnets.

Patent Document 1: JP 6-85630 A
Patent Document 2: JP 2008-92758 A
Patent Document 3: JP 2009-77463 A
Non-patent Document 1: J. Wang; K. Mitchell; G. W. Jewell; D. Howe: Multi-Degree-of-Freedom Spherical permanent Magnet Motors, Proc. ICRA2001 pp. 1798-1805, 2001
Non-patent Document 2: Bruno Dehez; Damien Grenier; Benoit Raucent: Two-Degree-of Freedom Spherical Actuator for Omnimobile ROBOT. Proc. 2002 IEEE International Conference on Robotics and Automation, pp. 2381-2386, 2002
Non-patent Document 3: A. Tanaka, M. Watada, S. Toril and D. Ebihara, "Proposal and Design of Multi-Degree-of-Freedom Spherical Actuator", Proc. of the 11th MAGDA Conference, pp. 169-172, 2002
Non-patent Document 4: K. M. Lee, H. Son, J. Joni: Concept Development and Design of a Spherical Wheel Motor (SWM). IEEE Transactions on Proceedings of the 2005 IEEE Int. Conf. Robotics and Automation, pp. 3663-3668, 2005
Non-patent Document 5: David Stein; Gregory S. Chirikjian: Experiments in the Communication and Motion Planning of a Spherical Stepper Motor. ASME paper DETOO/MECH-14115, pp.1-7, 2000

Non-patent Document 6: K. Kahlen; R. W. De Doncker: Current regulators for multiple-phase permanent magnet spherical machines. Proc. 2000 IEEE Industrial Application, pp.2011-2015, 2000

In the three-dimensional motor according to Patent Document 1, when an opening portion is increased for increasing the range of movement of the output axis, it may become impossible to dispose the windings for producing the rotating fields about the respective axes in the three orthogonal directions. This problem may be overcome by disposing the windings about the axes in the three directions inclined by approximately 10° from each plane in a three-dimensional space. However, in this case, the rotating field about a vertical axis may become the strongest, with the rotating field decreasing and becoming more unstable with increasing angle of inclination of the rotation axis of the output axis. Further, because the rotor is rotated by tracking the rotating field, it is difficult to keep the rotor stationary in the three-dimensional space. In addition, the three-dimensional motor needs to maintain the magnetic flux in a state close to a sine wave distribution when current flows through the windings, and this need needs to be somehow addressed.

In the spherical synchronous motor according to Non-patent Document 2, the winding in the output axis direction among the windings for producing the rotating fields about the respective axes in the three orthogonal directions is lacking for providing the output axis. Thus, as the rotation axis is inclined from the central axis in the opening, the rotating force sharply declines and becomes unstable. Further, the spherical synchronous motor is difficult to keep stationary, as in the case of the three-dimensional motor according to Patent Document 1. In addition, because the spherical induction motor is multipolarized, the produced torque may be smaller than that of the three-dimensional motor according to Patent Document 1.

In the spherical induction motor according to Non-patent Document 3, a large part of the winding is lacking due to the provision of an opening, so that it is difficult to uniformly compose rotating fields in a direction greatly inclined from the opening central axis. In the spherical induction motors according to Non-patent Documents 2 and 3, slipping is caused because they are both induction motors, so that positioning of the rotor is difficult.

In the spherical reluctance motor according to Non-patent Document 4, the rotation axis of the rotor as it rotates can be inclined only within the range of ±5° for structural reasons.

In the spherical stepping motor according to Non-patent Document 5, both the electromagnets and the permanent magnets of the rotor are disposed on circumferences about the center of the bottom surface. Thus, while rotation about the center of the bottom surface can be made by regularly determining the electromagnets through which current is to be passed, it is very difficult to determine the electromagnets for rotating the rotor in other directions. The more the center of the bottom surface of the rotor is displaced from the center of the bottom surface of the stator, the more difficult it becomes to rotate the rotor. This is due to the structure in which both the electromagnets and the permanent magnets are disposed concentrically about the center of the bottom surface.

In the spherical stepping motor according to Non-patent Document 6, when the rotor is rotated about the vertical axis, the rotation can be controlled in the same way as for a stepping motor with a 12-pole rotor and a 16-pole stator on a planar surface. However, when the axis is inclined, the control becomes suddenly difficult. This is due to the fact that it is very difficult to determine the currents to be supplied to the 96 electromagnets by a parallel computation process using a DSP board.

In all of the motors according to Patent Document 1 and Non-patent Documents 2 to 6, control of the rotation about the opening central axis may be considered an extension of conventional motor control technology. However, as the direction of the axis is displaced from the opening central axis, control becomes increasingly difficult or impossible. This is due to the fact that the motor structure does not have spherical symmetry.

The above problems may be overcome by the spherical stepping motor described in Patent Document 2. In the spherical stepping motor, strong drive force can be obtained even when the direction of the rotation axis of the rotor is displaced from the opening center of the stator, rotation control is easy, and large drive force can be obtained by increasing the lines of magnetic force that flow into and out of the magnetic path between the permanent magnets of the rotor and the electromagnets of the stator.

However, in the spherical stepping motor according to Patent Document 2, when the permanent magnets are arranged on the rotor, the permanent magnets disposed at the vertexes of the polyhedron have the same polarity. Thus, even when the magnetic path is formed by reversing the polarity of the permanent magnet disposed at the center of each face of the polyhedron, the magnetic path is concentrated at the permanent magnet positioned at the center of each face of the polyhedron. As a result, magnetic saturation may be caused and the output may be limited.

The above problem may be overcome by the spherical stepping motor and the spherical AC servo motor described in Patent Document 3. By adopting a polyhedron such that the number of the corners of each face is an even number (regular hexahedron or truncated octahedron) as the polyhedron inscribed in the rotor, the permanent magnets disposed on the rotor can be arranged such that all of the N-poles and S-poles are adjacent to one another. Thus, the spherical stepping motor and the spherical AC servo motor can be configured such that magnetic saturation can be avoided.

However, in the spherical stepping motor and the spherical AC servo motor according to Patent Document 3, because the polyhedron inscribed in the rotor is limited to the polyhedron such that the number of corners of each face is an even number, the structure of the rotor is strictly limited. Further, in Patent Documents 2 and 3, the number of corners of the polyhedron inscribed in the rotor and the number of corners of the polyhedron inscribed in the stator need to be coprime. Thus, the rotor and the stator are strictly limited structurally. Further, the rotation axis of the rotor and the rotation axis of the stator need to be aligned before the rotor is rotated, so that the corresponding structure and control need to be added.

In view of the above problems, an object of the present invention is to provide means such that the selection of the polyhedron inscribed in the rotor and the stator can be made more freely, so that the degree of freedom in designing the spherical stepping motor and the spherical AC servo motor can be significantly increased.

BRIEF SUMMARY OF THE INVENTION

In order to achieve the objective, the present invention adopts the following means.

A first means is a multiple pole spherical stepping motor including a rotor with N-pole permanent magnets disposed at vertexes of a virtual regular tetrahedron inscribed in a sphere and S-pole permanent magnets disposed at midpoints of arcs corresponding to sides connecting the vertexes; and a stator with electromagnets disposed at vertexes of a virtual regular tetrahedron inscribed in a sphere containing the sphere of the rotor and at trisecting points of arcs corresponding to sides connecting the vertexes.

A second means is a multiple pole spherical stepping motor including a rotor with N-pole and S-pole permanent magnets disposed alternately and adjacent to one another at vertexes of a virtual regular tetrahedron inscribed in a sphere and at points dividing arcs corresponding to sides connecting the vertexes into an even number of equal parts; and a stator with electromagnets disposed at vertexes of a virtual regular tetrahedron inscribed in a sphere containing the sphere of the rotor and at points dividing arcs corresponding to sides connecting the vertexes into an odd number of equal parts.

A third means is a multiple pole spherical stepping motor including a rotor with N-poles and S-poles disposed alternately and adjacent to each other at vertexes of a virtual regular hexahedron inscribed in a sphere and at points dividing arcs corresponding to sides connecting the vertexes into an odd number of equal parts; and a stator with electromagnets disposed at vertexes of a virtual regular hexahedron inscribed in a sphere containing the sphere of the rotor and at points dividing arcs corresponding to sides connecting the vertexes into an even number of equal parts.

A fourth means is the multiple pole spherical stepping motor according to one of the first and the second means. Each of the virtual regular tetrahedrons inscribed in the rotor and the stator is substituted by a virtual regular hexahedron, a virtual regular octahedron, a virtual regular dodecahedron, a virtual regular icosahedron, or a semi-regular polyhedron (a virtual truncated tetrahedron, a virtual truncated hexahedron, a virtual truncated octahedron, a virtual truncated dodecahedron, a virtual truncated icosahedron, a virtual cuboctahedron, a virtual icosidodecahedron, a virtual rhombicuboctahedron, a virtual rhombicosidodecahedron, a virtual rhombitruncated cuboctahedron, a virtual rhombitruncated icosidodecahedron, a virtual snub cube, or a virtual snub dodecahedron).

A fifth means is the multiple pole spherical stepping motor according to the third means, in which the virtual regular hexahedrons inscribed in the rotor and the stator are substituted by a virtual truncated octahedron, a virtual rhombitruncated cuboctahedron, or a virtual rhombitruncated icosidodecahedron.

A sixth means is a multiple pole spherical AC servo motor including the multiple pole spherical stepping motor according to any one of the first to the fifth means. The permanent magnets of the rotor are disposed in a Halbach array, and a sine wave current is supplied to the electromagnets.

In the spherical stepping motor and the spherical AC servo motor according to Patent Documents 2 and 3, even when the direction of the rotation axis of the rotor is displaced from the center of the opening of the stator, the positional relationship between the permanent magnets of the rotor and the electromagnets of the stator is the same as when the direction of the rotation axis of the rotor is at the center of the opening of the stator. Thus, even when the direction of the rotation axis of the rotor is displaced from the opening center of the stator, the same level of strong drive force can be obtained as when the direction of the rotation axis of the rotor is at the opening center of the stator, and a spherical stepping motor whose rotation can be easily controlled can be obtained.

Meanwhile, in the multiple pole spherical stepping motor and the multiple pole spherical AC servo motor according to the present invention, the range of selection of the rotor and stator structures can be drastically increased while the above features of the spherical stepping motor according to Patent Documents 2 and 3 are maintained, so that the degree of freedom in design can be significantly increased.

Further, in the multiple pole spherical stepping motor and the multiple pole spherical AC servo motor according to the present invention, the same polyhedron can be selected for the virtual polyhedron inscribed in the rotor and the virtual polyhedron inscribed in the stator. Thus, a simple configuration without the need for adding the mechanism and control for aligning the rotation axis of the rotor and the rotation axis of the stator can be implemented.

By adopting the multiple pole spherical stepping motor and the multiple pole spherical AC servo motor according to the present invention, the number of motors used in a multiple degrees of freedom system, such as a robot manipulator, a wheel drive system including steering, and active forceps, can be significantly decreased, so that such systems can be decreased in size and weight, and control simplification and saving in energy can be achieved.

DETAILED DESCRIPTION THE INVENTION

First, a basic configuration of a multiple pole spherical stepping motor and a multiple pole AC servo motor according to the present invention will be described. The multiple pole spherical stepping motor and the multiple pole AC servo motor according to the present invention basically include a rotor with permanent magnets disposed at the vertexes of polygons of an inscribed virtual polyhedron and at points of division of arcs connecting the vertexes such that N-poles and S-poles are adjacent to one another, and a stator with electromagnets disposed at the vertexes of polygons of an inscribed polyhedron and at points of division of arcs connecting the vertexes.

The multiple pole spherical stepping motor and the multiple pole AC servo motor according to the present invention may be configured by arbitrarily selecting the polyhedron inscribed in the rotor and the virtual polyhedron inscribed in the stator from the following polyhedrons: regular tetrahedron, regular hexahedron, regular octahedron, regular dodecahedron, regular icosahedron, truncated octahedron, truncated tetrahedron, truncated hexahedron, truncated octahedron, truncated dodecahedron, truncated icosahedron, cuboctahedron, icosidodecahedron, rhombicuboctahedron, rhombicosidodecahedron, rhombitruncated cuboctahedron, rhombitruncated icosidodecahedron, snub cube, and snub dodecahedron.

EXAMPLES

First Example

Next, a first embodiment of the present invention will be described with reference to FIGS. 1 to 6.

Figure 1:
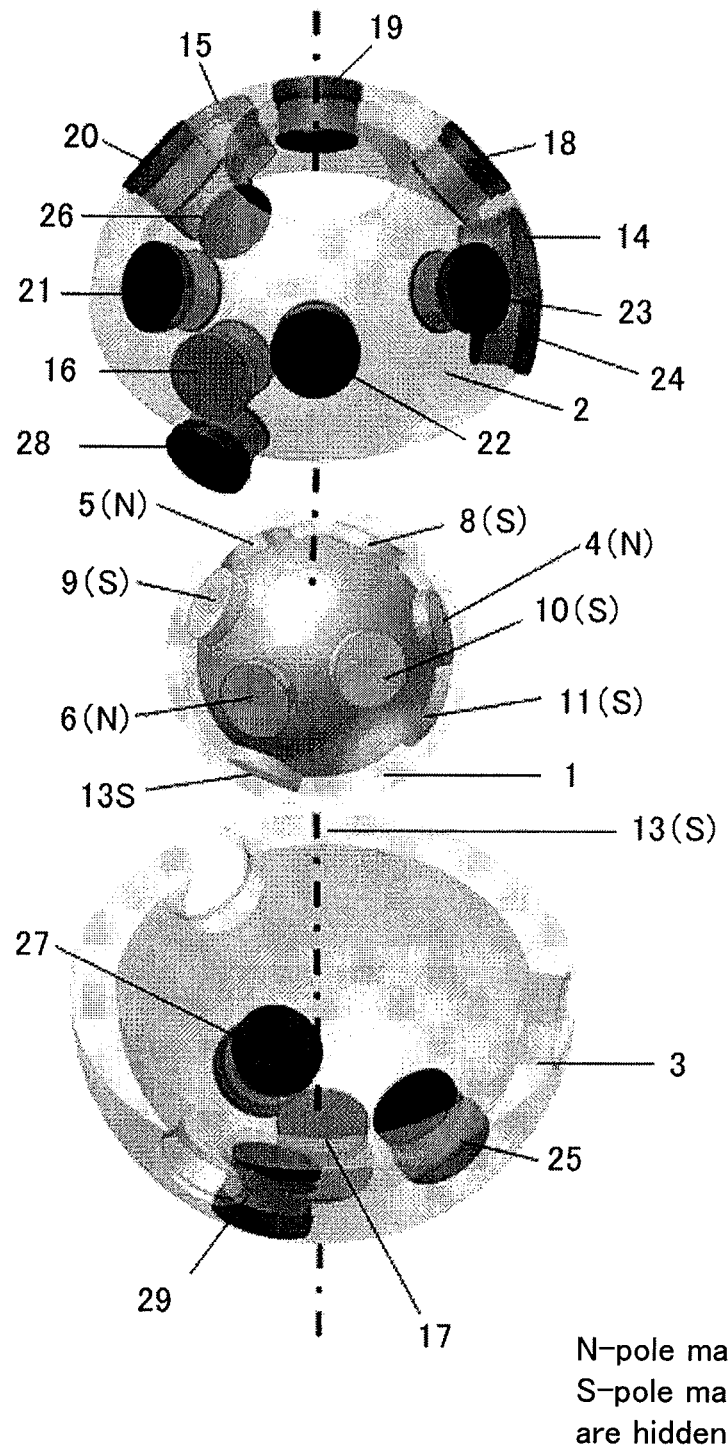
FIG. 1 illustrates a rotor 1, stators 2, 3, and a configuration of a spherical stepping motor combining the rotor and the stators according to the first embodiment.
Figure 2:
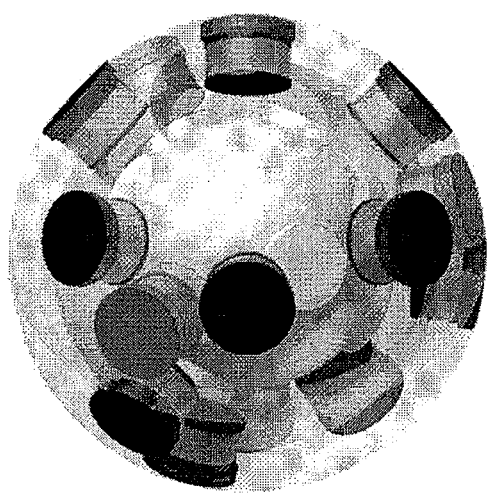
FIG. 2 is a bird's eye view of the spherical stepping motor illustrated in FIG. 1.

FIG. 1 illustrates a rotor 1, a stator upper hemisphere 2, a stator lower hemisphere 3, and their central axis according to the present embodiment. FIG. 2 is a bird's eye view of a spherical stepping motor combining the rotor and the stator illustrated in FIG. 1.

As illustrated in FIG. 1, the rotor 1 is embedded with permanent magnets at the four vertexes 4 to 7 of an inscribed virtual regular tetrahedron and at points 8 to 13 corresponding to the midpoints of arcs connecting the vertexes, the permanent magnets having surfaces conforming to the rotor 1. The polarity of the permanent magnets is inverted between adjacent permanent magnets. Namely, the permanent magnets are embedded such that the points 4, 5, 6, and 7 have an N-pole on the outside while the vertexes 8, 9, 10, 11, 12, and 13 have an S-pole on the outside. On the stators 2, 3, electromagnets are disposed at the vertexes 14 to 17 of an inscribed virtual regular tetrahedron and at positions corresponding to trisecting points 18 to 29 of the arcs connecting the vertexes.

Next, a rotating operation about a vertical axis of the spherical stepping motor according to the present embodiment will be described with reference to FIGS. 3 to 6.

Figure 3:
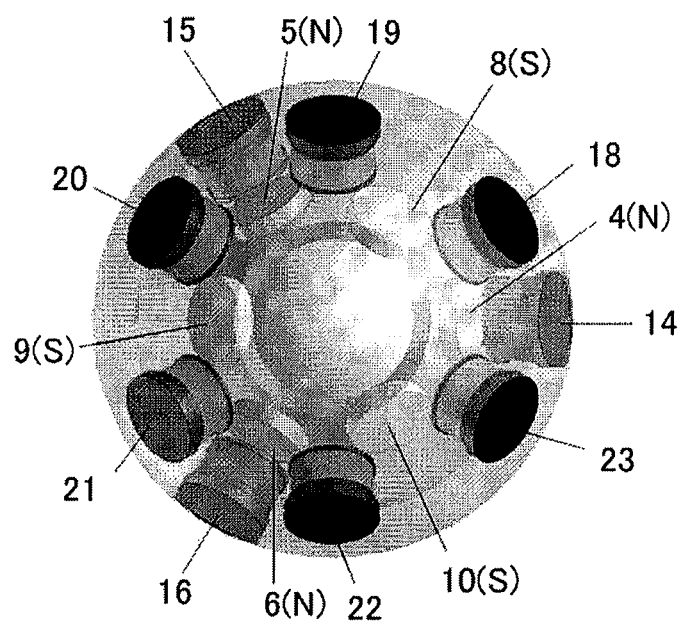
FIG. 3 illustrates the rotor 1 of the spherical stepping motor according to the first embodiment as viewed from above when the rotation axis is oriented directly upward.
Figure 4:
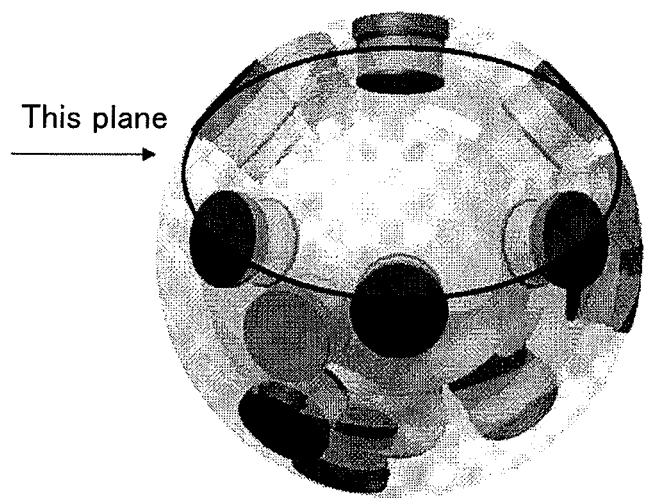
FIG. 4 is a bird's eye view of the spherical stepping motor of FIG. 3, where "This plane" corresponds to FIG. 3.

FIG. 3 illustrates the spherical stepping motor as viewed from directly above when an output axis of the rotor 1 is oriented directly upward. FIG. 4 is a bird's eye view of the spherical stepping motor illustrated in FIG. 3, where "This plane" corresponds to FIG. 3.

In FIG. 3, currents are supplied such that the electromagnets 18, 20, and 22 have an N-pole, the electromagnets 19, 21, and 23 have an S-pole, and the electromagnets 14, 15, and 16 have an N-pole immediately after rotation. Then, the permanent magnets 4, 5, 6, 8, 9, and 10 are respectively subjected to attractive force or repulsive force such that the rotor 1 is rotated in clockwise direction until the permanent magnet 4 is at a position with the minimum distance from the electromagnet 19 (20°). At this point, the electromagnets 19, 21, and 23 are turned off, and, when the rotor 1 is further rotated, currents are supplied such that the electromagnets 19, 21, and 23 have an N-pole. Then, the rotor 1 is further rotated in clockwise direction by 20°.

Thereafter, with reference to the position illustrated in FIG. 3, the polarity of the electromagnets 18, 20, and 22, which initially have an N-pole, is switched to an S-pole at 40°, to an N-pole at 100°, to an S-pole at 160°, and is thereafter switched at every 60° of rotation of the rotor 1. The polarity of the electromagnets 19, 21, and 23, which initially have an S-pole, is switched to an N-pole at 20°, to an S-pole at 80°, and is thereafter switched at every 60° of rotation of the rotor 1. The polarity of the electromagnets 14, 15, and 16 is switched to an N-pole immediately after the start of rotation from 0°, to an S-pole at 60°, and is thereafter switched at every 60° of rotation of the rotor 1. Thus, the rotor 1 can be continuously rotated in clockwise direction.

A rotating operation of the multiple pole spherical stepping motor according to the present embodiment about an inclined axis will be described with reference to FIGS. 5 and 6.

Figure 5:
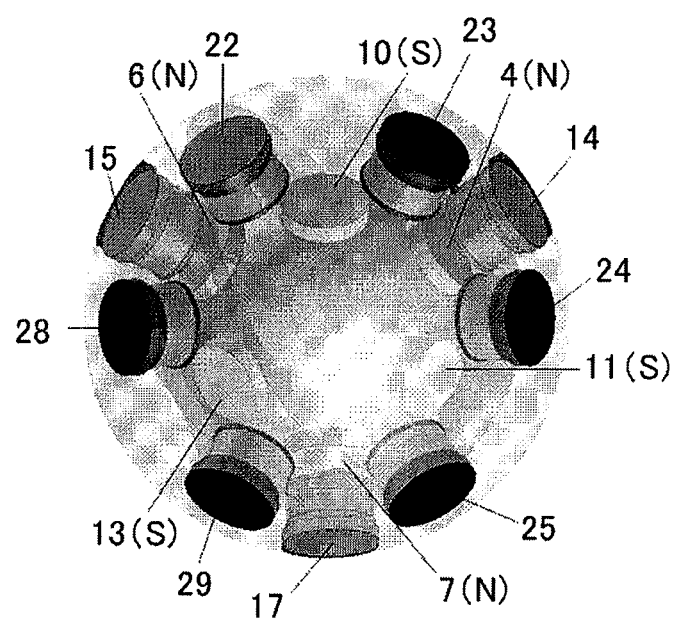
FIG. 5 illustrates the relationship between the permanent magnets of the rotor 1 and the electromagnets of the stators 2, 3 in the spherical stepping motor according to the first embodiment, when the rotation axis of the rotor 1 is oriented diagonally downward.
Figure 6:
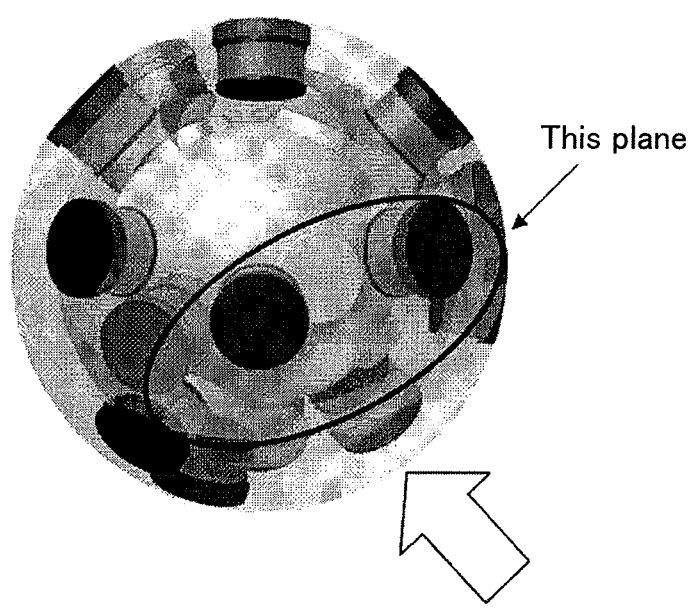
FIG. 6 is a bird's eye view of the spherical stepping motor of FIG. 5, where "This plane" corresponds to FIG. 5.

FIG. 5 illustrates the spherical stepping motor with the rotation axis of the rotor 1 inclined with respect to the stators 2, 3, as viewed from the direction of an arrow. Although FIG. 5 differs in corresponding numbers, the positional relationship between the permanent magnets of the rotor and the electromagnets of the stator is the same as that of FIG. 3. Thus, with reference to the position of FIG. 5, the polarity of the electromagnets 23, 25, and 28, which initially have an N-pole, is switched to an S-pole at 40°, to an N-pole at 100°, to an S-pole at 160°, and is thereafter switched at every 60° of rotation of the rotor 1. The polarity of the electromagnets 22, 24, and 29, which initially have an S-pole, is switched to an N-pole at 20°, to an S-pole at 80°, and is thereafter switched at every 60° of rotation of the rotor 1. The polarity of the electromagnets 14, 15, and 17 is switched to an N-pole immediately after the start of rotation from 0°, to an S-pole at 60° and is thereafter switched at every 60° of rotation of the rotor 1. Thus, the rotor 1 can be continuously rotated in clockwise direction about the arrow as the rotation axis.

In this spherical stepping motor, the rotor can be rotated about the center lines of the faces of the regular tetrahedron inscribed in the stator as the axis. There are four such axes, so that the rotor 1 can be continuously rotated about arbitrary four axes. It will be seen from the above control method that the multiple pole spherical stepping motor according to the present embodiment is characterized in that the control method and the output torque are not varied depending on the direction of the rotor.

Second Example

A second embodiment of the present invention will be described with reference to FIGS. 7 and 8.

Figure 7:
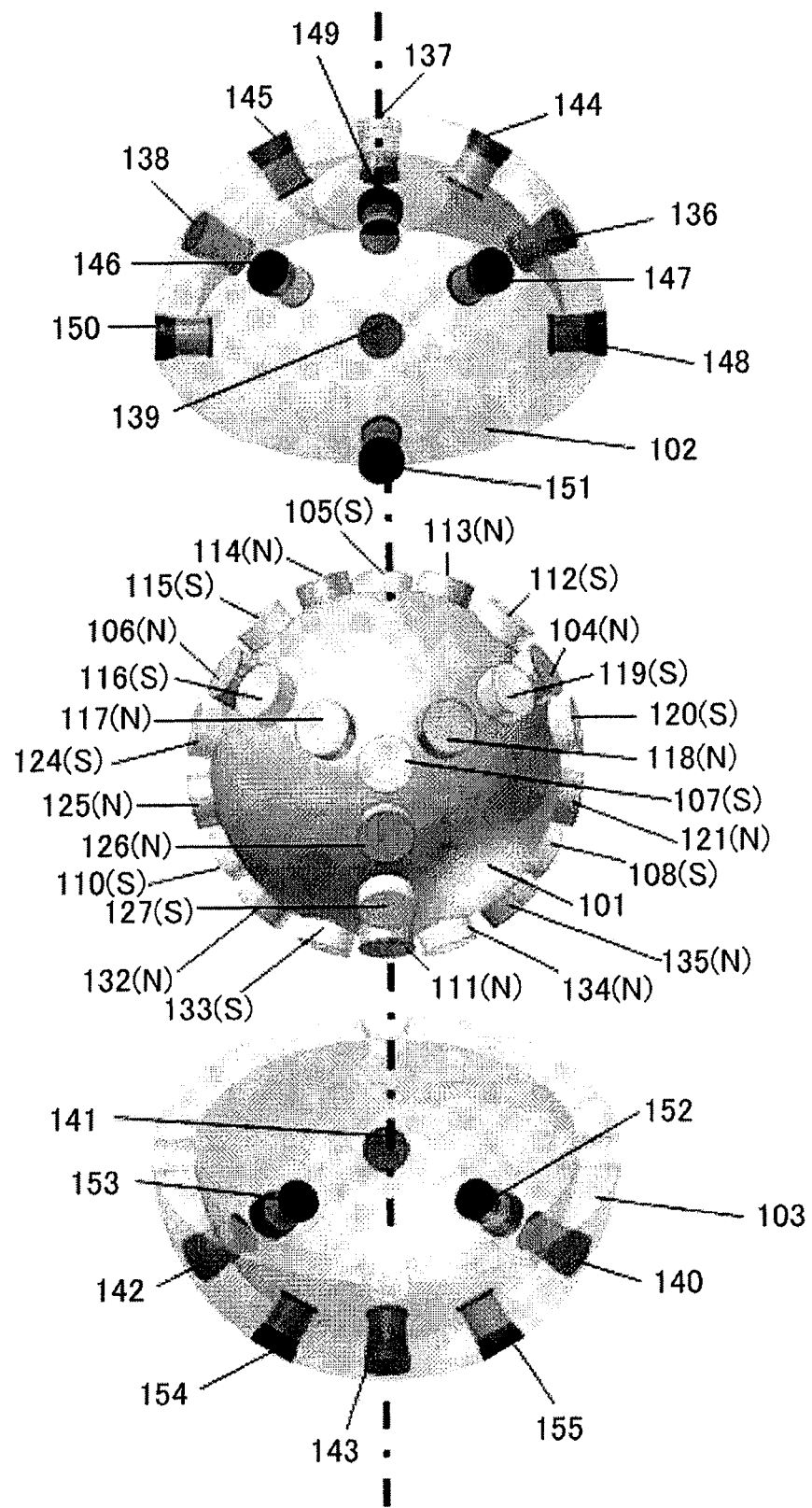
FIG. 7 illustrates a configuration of a spherical stepping motor combining a rotor 101 and stators 102, 103 according to the second embodiment.
Figure 8:
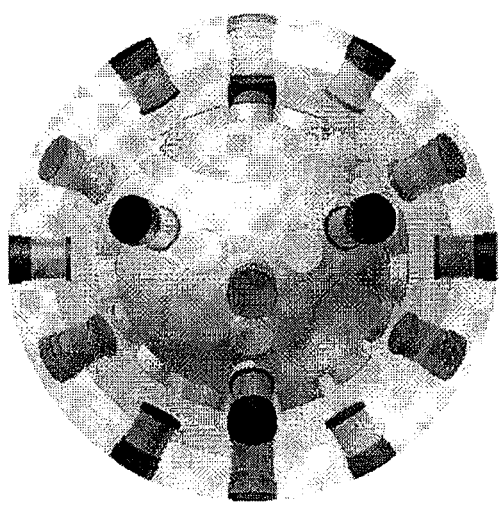
FIG. 8 is a bird's eye view of the spherical stepping motor illustrated in FIG. 7.

FIG. 7 illustrates a rotor 101, a stator upper hemisphere 102, a stator lower hemisphere 103, and their central axis according to the present embodiment. FIG. 8 is a bird's eye view of a spherical stepping motor combining the rotor, the stator upper hemisphere, and the stator lower hemisphere illustrated in FIG. 7.

As illustrated in FIG. 1, the rotor 1 is embedded with permanent magnets at the eight vertexes 104 to 111 of an inscribed virtual regular hexahedron and at 24 points 112 to 135 corresponding to trisecting points of arcs connecting the vertexes, the permanent magnets having a surface conforming to the rotor 1. The polarity of the permanent magnets is inverted between adjacent permanent magnets. For example, the points 104, 112, 113, and 105 disposed along a side have an N-pole, an S-pole, an N-pole, and an S-pole, respectively.

Meanwhile, the stators 102, 103 are provided with electromagnets disposed at the eight vertexes 136 to 143 of an inscribed virtual regular hexahedron and at positions corresponding to midpoints 144 to 155 of arcs connecting the vertexes.

The spherical stepping motor is characterized in that, compared with the first embodiment, the polyhedrons inscribed in the rotor and the stator of the spherical stepping motor are regular hexahedrons; that the permanent magnets are disposed at the vertexes of the polyhedron inscribed in the rotor and at points dividing the sides into an odd number of parts such that N-poles and S-poles are adjacent to one another; and that the electromagnets are disposed at the vertexes of the polyhedron inscribed in the stator and at points dividing the sides into an even number of parts.

Next, a rotating operation of the spherical stepping motor according to the present embodiment about a vertical axis will be described with reference to FIGS. 9 to 12.

Figure 9:
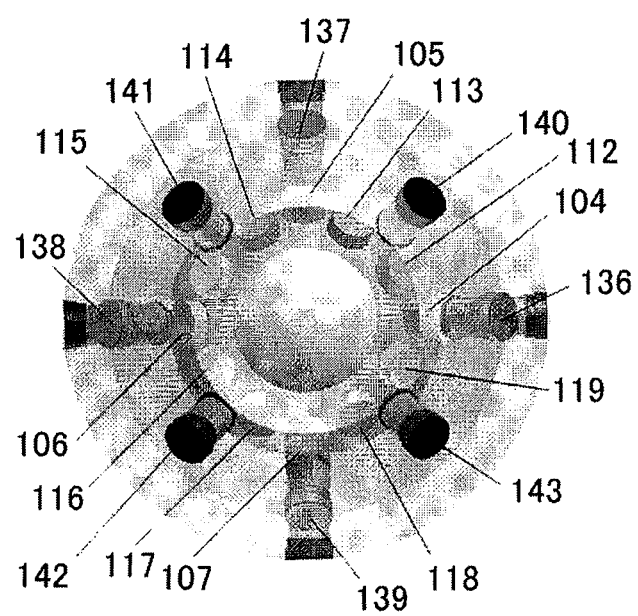
FIG. 9 illustrates the spherical stepping motor according to the second embodiment as viewed from directly above, where the rotation axis of the rotor 101 is oriented directly upward.
Figure 10:
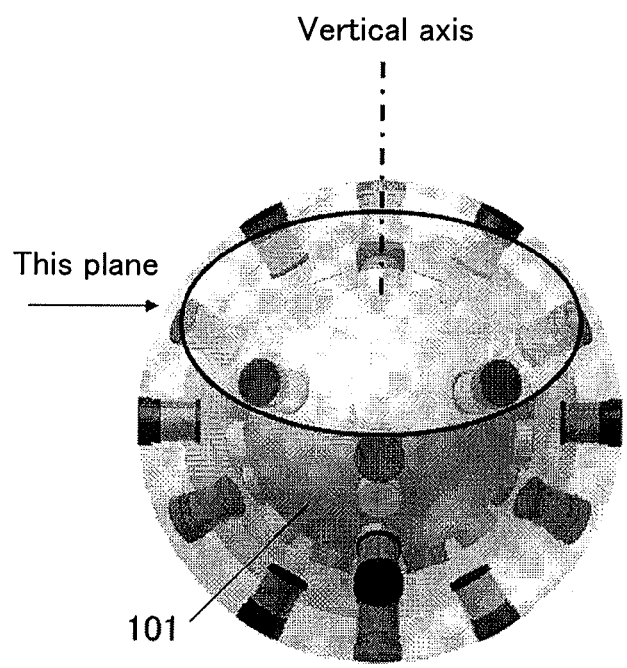
FIG. 10 is a bird's eye view of the spherical stepping motor illustrated in FIG. 9, where "This plane" corresponds to FIG. 9.

FIG. 9 illustrates the rotor 101 of the spherical stepping motor as viewed from directly above when the output axis is oriented directly upward. FIG. 10 is a bird's eye view of the spherical stepping motor illustrated in FIG. 9, where "This plane" corresponds to FIG. 9.

In FIG. 9, currents are supplied such that the electromagnets 141 and 143 have an N-pole, the electromagnets 140 and 142 have an S-pole, the electromagnets 136 and 138 have an N-pole immediately after rotation, and the electromagnets 137 and 139 have an S-pole immediately after rotation. Then, the permanent magnets 104 to 107 and 112 to 119 are subjected to an attractive force or a repulsive force, respectively, such that the rotor 101 is rotated in clockwise direction until the permanent magnet 113 is at a position with the minimum distance from the electromagnet 140 (15°). At this point, the electromagnets 140, 141, 142, and 143 are turned off, and, when the rotor 1 is further rotated, currents are supplied such that the electromagnets 141 and 143 have an N-pole and the electromagnets 140 and 142 have an S-pole. Then, the rotor 1 is further rotated in clockwise direction by 15°.

Thereafter, with reference to the position of FIG. 9, the polarity of the electromagnets 141 and 143, which initially have an N-pole, is switched to an S-pole at 15°, to an N-pole at 45°, to an S-pole at 75°, and is thereafter switched at every 30° rotation of the rotor 101. The polarity of the electromagnets 140 and 142, which initially have an S-pole, is switched to an N-pole at 15°, to an S-pole at 45°, and is thereafter switched at every 30° rotation of the rotor 101. The polarity of the electromagnets 137 and 139 is switched to an N-pole immediately after the start of rotation from 0°, to an S-pole at 30°, and is thereafter switched at every 30° rotation of the rotor 101. The polarity of the electromagnets 136 and 138 is switched to an S-pole immediately after the start of rotation from 0°, to an N-pole at 30°, and is thereafter switched at every 30° rotation of the rotor 101. Thus, the rotor 101 can be continuously rotated in clockwise direction.

A rotating operation of the multiple pole spherical stepping motor about a horizontal axis according to the present embodiment will be described with reference to FIGS. 11 and 12.

Figure 11:
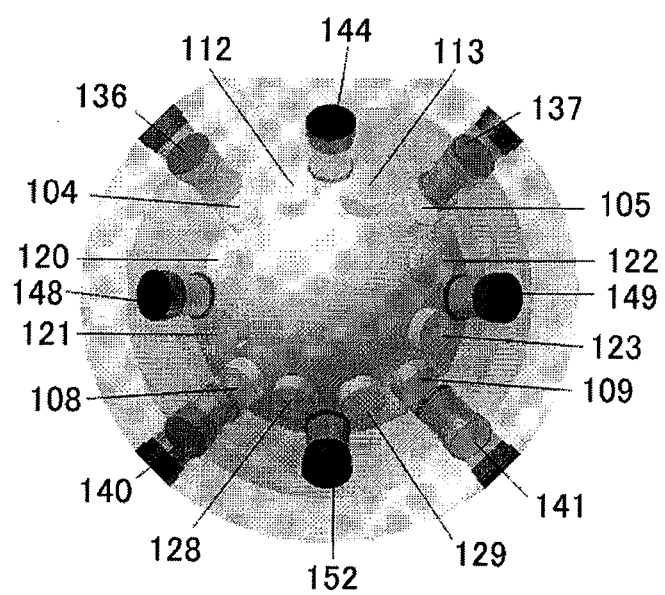
FIG. 11 illustrates the relationship between the permanent magnets of the rotor 101 and the electromagnets of the stators 102, 103 in the spherical stepping motor according to the second embodiment, when the rotation axis of the rotor 101 is oriented directly laterally.
Figure 12:
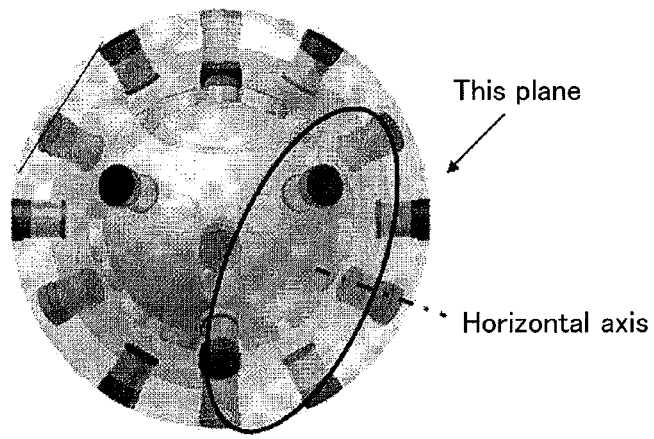
FIG. 12 is a bird's eye view of the spherical stepping motor of FIG. 11, where "This plane" corresponds to FIG. 11.

FIG. 11 illustrates the spherical stepping motor in a state in which the rotation axis of the rotor 101 is horizontal with respect to the stators 102, 103, as viewed from a horizontal axis direction. While FIG. 11 may differ in corresponding numbers and the angle of rotation of the rotor, the relationship between the permanent magnets of the rotor and the electromagnets of the stator is the same as that of FIG. 8. Thus, with reference to the position of FIG. 11, the polarity of the electromagnets 144 and 152, which initially have an N-pole, is switched to an S-pole at 15°, to an N-pole at 45°, to an S-pole at 75°, and is hereafter switched at every 30°rotation of the rotor 101. The polarity of the electromagnets 148 and 149, which initially have an S-pole, is switched to an N-pole at 15°, to an S-pole at 45°, and is hereafter switched at every 30° rotation of the rotor 101. The polarity of the electromagnets 136 and 141 is switched to an N-pole immediately after the start of rotation from 0°, to an S-pole at 30°, and is thereafter switched at every 30° rotation of the rotor 101. The polarity of the electromagnets 137 and 140 is switched to an S-pole immediately after the start of rotation from 0°, to an N-pole at 30° and thereafter switched at every 30° rotation of the rotor 101. Thus, the rotor 101 can be continuously rotated in clockwise direction about the horizontal axis as the rotation axis.

In the spherical stepping motor, the rotor can be rotated about the center lines of the faces of the virtual regular hexahedron inscribed in the stator as the axes. There are three such axes, so that the rotor 101 can be continuously rotated about arbitrary three axes. It will be seen from the above control method that the multiple pole spherical stepping motor according to the present embodiment is also characterized in that the control method and the output torque are not varied depending on the direction of the rotor.

(Multiple Pole Spherical AC Servo Motor)

The above spherical stepping motors may be configured as a multiple pole spherical AC servo motor by additionally providing permanent magnets in the middle of the N-poles and the S-poles of the permanent magnets on the rotor in a Halbach array, and supplying a sine wave current to the electromagnets.

Figure 13:
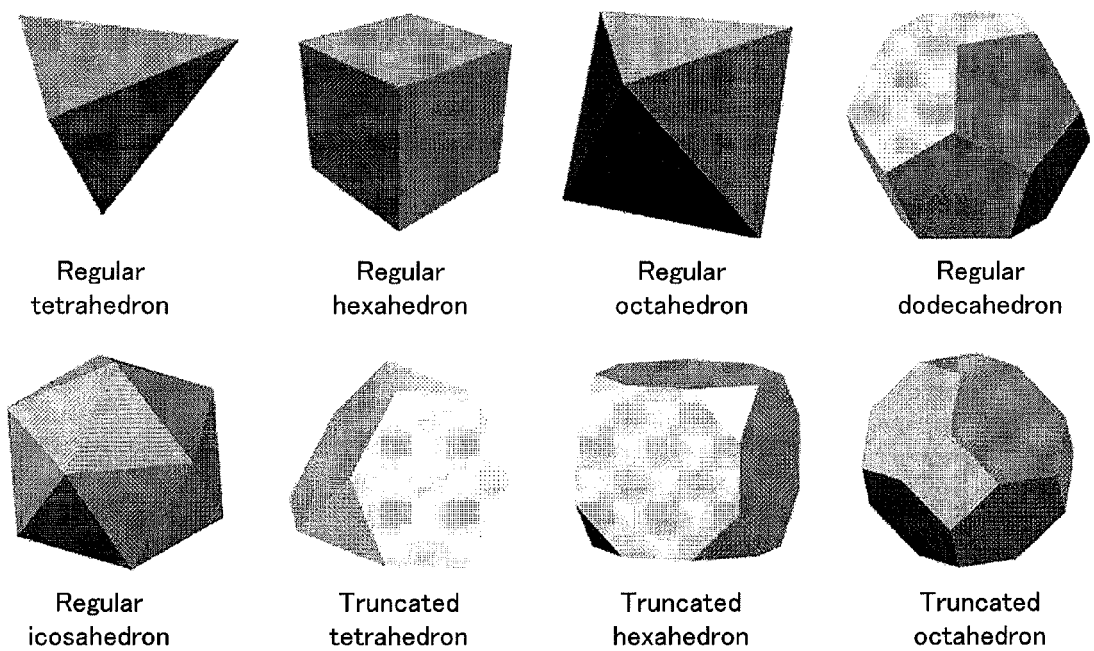
FIG. 13 illustrates polyhedrons that may be used as a virtual polyhedron according to the present invention.
Figure 14:
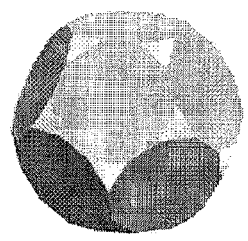
FIG. 14 illustrates other examples of polyhedrons that may be used as a virtual polyhedron according to the present invention.
Figure 14:
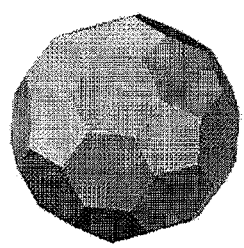
Figure 14:
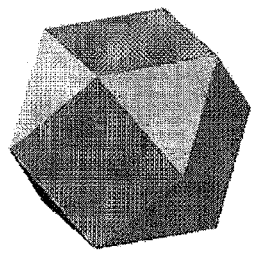
Figure 14:
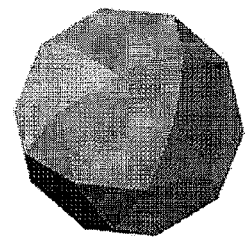
Figure 14:
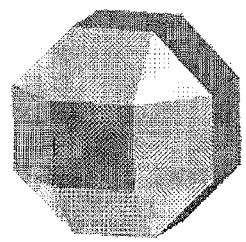
Figure 14:
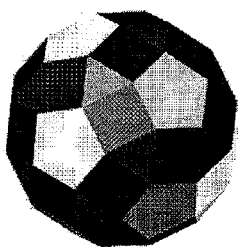
Figure 14:
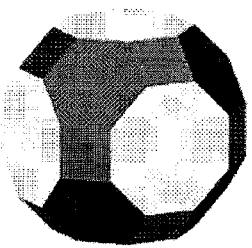
Figure 14:

FIGS. 13 and 14 illustrate polyhedrons that may be used as the virtual polyhedrons according to the present invention.

INDUSTRIAL FIELD OF APPLICABILITY

The number of motors used in a multiple degrees of freedom system, such as a robot manipulator, a wheel drive system including steering, and active forceps, can be greatly decreased, so that such systems can be decreased in size and weight, and control simplification and saving of energy can be achieved.

REFERENCE SIGNS LIST

1 Rotor according to first embodiment
2 Upper-half of stator according to first embodiment.
3 Lower-half of stator according to first embodiment
4-13 Permanent magnets of rotor 1
14-29 Electromagnets of stator 2, 3
101 Rotor according to second embodiment
102 Upper-half of stator according to second embodiment
103 Lower-half of stator according to second embodiment
104-135 Permanent magnets of rotor 101
136-155 Electromagnets of stator 102, 103

We claim:
1. A multiple pole spherical stepping motor comprising:
a rotor with N-pole permanent magnets disposed at vertexes of a virtual regular tetrahedron inscribed in a sphere and S-pole permanent magnets disposed at midpoints of arcs corresponding to sides connecting the vertexes; and
a stator with electromagnets disposed at vertexes of a virtual regular tetrahedron inscribed in a sphere containing the sphere of the rotor and at trisecting points of arcs corresponding to sides connecting the vertexes.

2. A multiple pole spherical stepping motor comprising:
a rotor with N-pole and S-pole permanent magnets disposed alternately and adjacent to one another at vertexes of a virtual regular tetrahedron inscribed in a sphere and at points dividing arcs corresponding to sides connecting the vertexes into an even number of equal parts; and
a stator with electromagnets disposed at vertexes of a virtual regular tetrahedron inscribed in a sphere containing the sphere of the rotor and at points dividing arcs corresponding to sides connecting the vertexes into an odd number of equal parts.

3. A multiple pole spherical stepping motor comprising:
a rotor with N-poles and S-poles disposed alternately and adjacent to one another at vertexes of a virtual regular hexahedron inscribed in a sphere and at points dividing arcs corresponding to sides connecting the vertexes into an odd number of equal parts; and
a stator with electromagnets disposed at vertexes of a virtual regular hexahedron inscribed in a sphere containing the sphere of the rotor and at points dividing arcs corresponding to sides connecting the vertexes into an even number of equal parts.

4. The multiple pole spherical stepping motor according to claim 1, wherein each of the virtual regular tetrahedrons inscribed in the rotor and the stator is substituted by a virtual regular hexahedron, a virtual regular octahedron, a virtual regular dodecahedron, a virtual regular icosahedron, a virtual truncated tetrahedron, a virtual truncated hexahedron, a virtual truncated octahedron, a virtual truncated dodecahedron, a virtual truncated icosahedron, a virtual cuboctahedron, a virtual icosidodecahedron, a virtual rhombicuboctahedron, a virtual rhombicosidodecahedron, a virtual rhombitruncated cuboctahedron, a virtual rhombitruncated icosidodecahedron, a virtual snub cube, or a virtual snub dodecahedron.

5. The multiple pole spherical stepping motor according to claim 3, wherein the virtual regular hexahedrons inscribed in the rotor and the stator are substituted by a virtual truncated octahedron, a virtual rhombitruncated cuboctahedron, or a virtual rhombitruncated icosidodecahedron.

6. A multiple pole spherical AC servo motor comprising the multiple pole spherical stepping motor according to claim 1,
wherein the permanent magnets of the rotor are disposed in a Halbach array; and a sine wave current is supplied to the electromagnets.

7. The multiple pole spherical stepping motor according to claim 2, wherein each of the virtual regular tetrahedrons inscribed in the rotor and the stator is substituted by a virtual regular hexahedron, a virtual regular octahedron, a virtual regular dodecahedron, a virtual regular icosahedron, a virtual truncated tetrahedron, a virtual truncated hexahedron, a virtual truncated octahedron, a virtual truncated dodecahedron, a virtual truncated icosahedron, a virtual cuboctahedron, a virtual icosidodecahedron, a virtual rhombicuboctahedron, a virtual rhombicosidodecahedron, a virtual rhombitruncated cuboctahedron, a virtual rhombitruncated icosidodecahedron, a virtual snub cube, or a virtual snub dodecahedron.

8. A multiple pole spherical AC servo motor comprising the multiple pole spherical stepping motor according to claim 2,
wherein the permanent magnets of the rotor are disposed in a Halbach array; and a sine wave current is supplied to the electromagnets.

9. A multiple pole spherical AC servo motor comprising the multiple pole spherical stepping motor according to claim 3,
wherein the permanent magnets of the rotor are disposed in a Halbach array; and a sine wave current is supplied to the electromagnets.

10. A multiple pole spherical AC servo motor comprising the multiple pole spherical stepping motor according to claim 4,
wherein the permanent magnets of the rotor are disposed in a Halbach array; and a sine wave current is supplied to the electromagnets.

11. A multiple pole spherical AC servo motor comprising the multiple pole spherical stepping motor according to claim 5,
wherein the permanent magnets of the rotor are disposed in a Halbach array; and a sine wave current is supplied to the electromagnets.

12. A multiple pole spherical AC servo motor comprising the multiple pole spherical stepping motor according to claim 7,
wherein the permanent magnets of the rotor are disposed in a Halbach array; and a sine wave current is supplied to the electromagnets.

\* \* \* \* \*